US012609090B2

(12) United States Patent
Barel

(10) Patent No.: US 12,609,090 B2
(45) Date of Patent: Apr. 21, 2026

(54) SENSOR VALIDATION USING EXTERNAL DEVICES

(71) Applicant: Microsoft Technology Licensing, LLC, Redmond, WA (US)

(72) Inventor: Eliyahu Barel, Rosh-HaAyin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/966,550

(22) Filed: Dec. 3, 2024

(65) Prior Publication Data

US 2025/0218407 A1 Jul. 3, 2025

Related U.S. Application Data

(63) Continuation of application No. 18/397,928, filed on Dec. 27, 2023, now Pat. No. 12,190,831.

(51) Int. Cl.
*G09G 3/34* (2006.01)

(52) U.S. Cl.
CPC ..... *G09G 3/3413* (2013.01); *G09G 2320/041* (2013.01); *G09G 2320/0666* (2013.01); *G09G 2330/023* (2013.01); *G09G 2360/144* (2013.01)

(58) Field of Classification Search
CPC ........... G09G 3/3413; G09G 2320/041; G09G 2320/0666; G09G 2330/023; G09G 2360/144
See application file for complete search history.

(56) References Cited

U.S. PATENT DOCUMENTS

| | | | | |
|---|---|---|---|---|
| 9,442,025 | B2 * | 9/2016 | Yang | G01K 7/01 |
| 2017/0069307 | A1 * | 3/2017 | Min | G06V 10/98 |
| 2017/0289738 | A1 * | 10/2017 | Jepson | A61B 5/6898 |
| 2021/0181820 | A1 * | 6/2021 | Shenoy | G01K 13/00 |
| 2023/0007211 | A1 * | 1/2023 | Suzuki | H05B 47/11 |

* cited by examiner

*Primary Examiner* — Jonathan A Boyd

(74) *Attorney, Agent, or Firm* — Alleman Hall LLP

(57) ABSTRACT

Implementations for validating sensors using external device(s) are provided. One aspect includes a computing system comprising a first ambient light sensor system; and processing circuitry and memory storing instructions that causes the processing circuitry to: detect the external device in vicinity of the computing device, wherein the external device comprises a second ambient light sensor system; determine an orientation of the first ambient light sensor system; receive information describing an orientation of and sensor data of the second ambient light sensor system; determine a relative orientation based at least upon the orientation of the first ambient light sensor system and the information describing the orientation of the second ambient light sensor system; and perform correction of sensor data of the first ambient light sensor system based at least upon the relative orientation and the information describing the sensor data of the second ambient light sensor system.

18 Claims, 11 Drawing Sheets

SENSOR VALIDATION USING EXTERNAL DEVICES

CROSS REFERENCE TO RELATED APPLICATIONS

This application is a continuation of U.S. patent application Ser. No. 18/397,928, filed Dec. 27, 2023, the entire contents of which is hereby incorporated herein by reference for all purposes.

BACKGROUND

Computing devices with displays, such as smartphones, tablets, laptops, televisions, etc., often include an ambient light sensor component for detecting and sensing ambient light information. The ambient light sensor can be implemented with a photodetector for sensing the amount of ambient light present, and the information can be provided to a processor of the computing device. The processor can utilize the information to change one or more settings for controlling a display, including internal and external displays. For example, the processor can send appropriate signals to dim or brighten pixels of a liquid crystal display (LCD) screen based at least upon information from the ambient light sensor.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Implementations of systems and methods for validating sensors using an external device are provided. One aspect includes a computing comprising: a first ambient light sensor system comprising an ambient light intensity sensor and an ambient color sensor; processing circuitry and memory storing instructions that, during execution by the processing circuitry, causes the processing circuitry to: detect the external device in vicinity of the computing device, wherein the external device comprises a second ambient light sensor system; determine an orientation of the first ambient light sensor system; receive information describing an orientation of the second ambient light sensor system and information describing sensor data of the second ambient light sensor system; determine a relative orientation based at least upon the orientation of the first ambient light sensor system and the information describing the orientation of the second ambient light sensor system; and perform correction of sensor data of the first ambient light sensor system based at least upon the relative orientation and the information describing the sensor data of the second ambient light sensor system.

DETAILED DESCRIPTION

Figure 1:
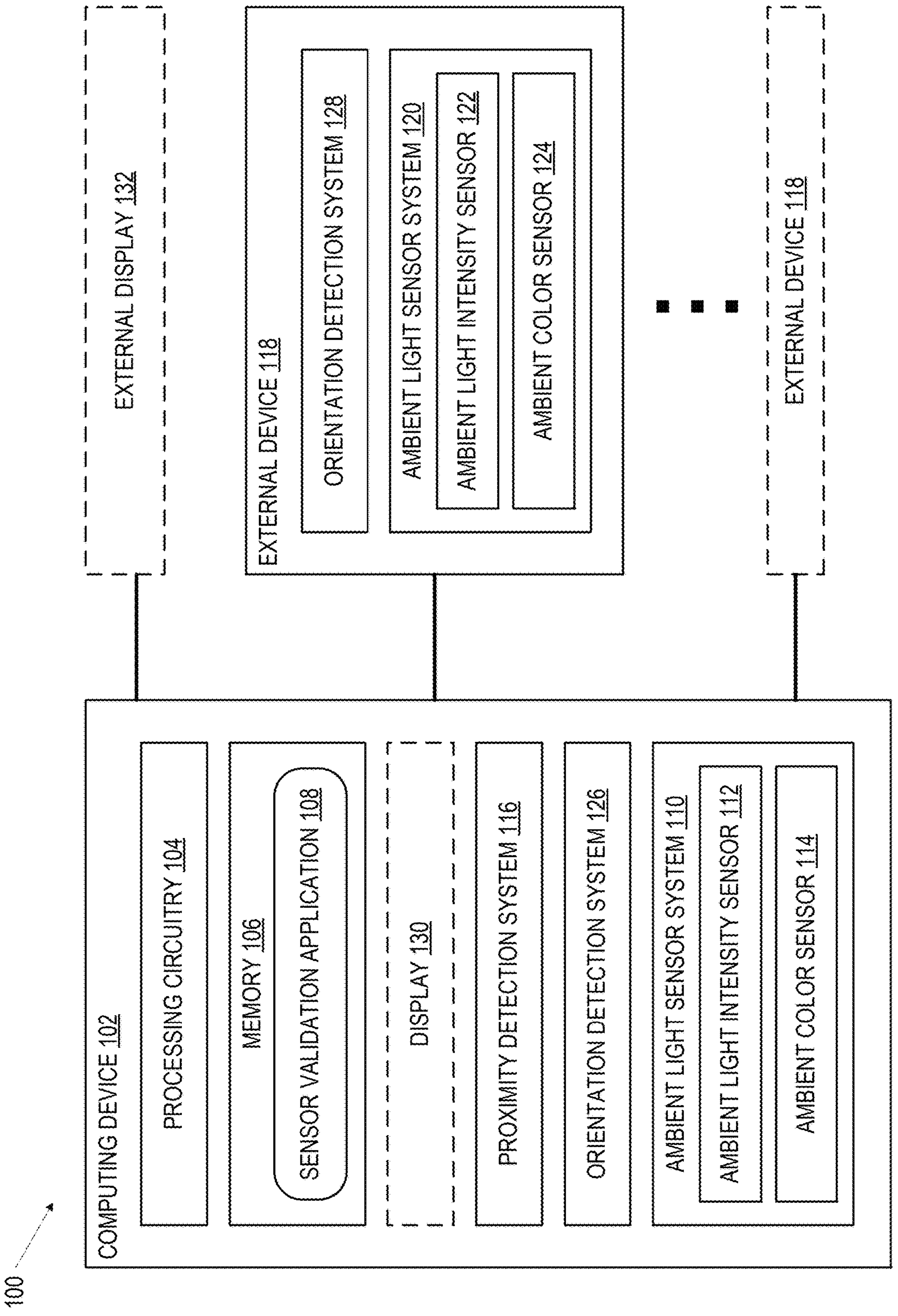
FIG. 1 shows a block diagram of an example sensor validation system for ambient light sensor validation.

Computing devices can include many different types of sensors for various applications. Oftentimes, the sensors are implemented to provide autonomous functions and controls for the computing device. For example, laptops, tablets, and smartphones often include an embedded ambient light sensor for detecting ambient illuminance and/or ambient color. Information from the ambient light sensor can be used to adjust the displays of such devices accordingly. Usage of computing devices in different environments may have different preferential display settings for the displays of said computing devices to provide a more comfortable user viewing experience. As such, the computing device can adjust the settings of the display to adapt to different environments using information from the ambient light sensor. Generally, bright environments, such as outdoor venues, result in high brightness display settings for comfortable viewing. Dim environments, such as low-light indoor environments, can result in low brightness display settings to accommodate the user's low-light adapted pupils and/or to conserve battery life of the computing device.

Usage of embedded sensors for performing autonomous control of computing devices presents several issues. Many different scenarios can result in unreliable sensor readings. For example, ambient light sensors embedded in mobile devices, such as laptops and smartphones, may have ambient light intensity readings that vary depending on the sensors' orientations with respect to the light source—e.g., an ambient light sensor facing towards a light bulb will generally have a higher illuminance/intensity measurement (LUX) than another ambient light sensor that is oriented away from the light bulb, given the same distance away from the light source. However, to the user, the viewing conditions for both devices should be similar. As such, readings from the ambient light sensors may incorrectly assume the user's viewing conditions. In some scenarios, design limitations, such as sensors placed under a device's bezel or under an organic light-emitting diode (OLED) panel, may result in less reliable sensor readings compared to more traditional sensor placements. Other issues resulting in unreliable readings include non-calibrated, degraded, damaged, and/or blocked sensors.

Another reliability issue with the use of embedded sensors includes the use of ambient temperature sensors for determining internal operating temperature thresholds. Design limitations for computing devices can include operational compliance with regulations that specify an internal operating temperature threshold given an ambient temperature reading. However, oftentimes, an ambient temperature sensor may produce unreliable readings due to interference from heat generated by the computing device. For example, computing devices operating at a high load can generate a considerable amount of heat, which can cause interference if the generated heat is in proximity to the ambient temperature sensor.

In view of the observations above, examples of systems and methods for sensor validation using one or more external devices are provided. Sensor validation for a computing device can be performed to compensate for and/or provide a complementary solution to unreliable sensor readings. Sensor validation can be implemented for the computing device using information from an external device, such as sensor data from an embedded sensor of the external device. Upon detecting that the external device is in the vicinity of the computing device, the sensor validation process can be implemented on the computing device to receive information from the detected external device and to use the received information to perform correction of sensor data from one or more embedded sensors of the computing device. Information received from the external device can be used in various ways. For example, in some cases, sensor data from embedded sensors of the computing device may be determined to be unreliable due to various reasons, examples of which are discussed in further detail in the sections below. The information describing sensor data from the external device can be used to augment or replace sensor readings of the computing device to provide more accurate sensor readings, including but not limited to ambient light intensity and color readings, to the computing device. Different scenarios and use cases can alter how information from the external device is utilized. In some implementations, a relative orientation between a sensor of the computing device and a corresponding sensor of the external device is used to determine how the information from the external device is utilized. Other factors in determining how the information can be utilized include relative distances between the two devices, differences among sensor readings, and stored historical data. For example, larger deviations in distances may indicate that a smaller weight should be applied to the sensor data of the external device in its use for performing correction of sensor data of the computing device. Such factors, including but not limited to relative distances and relative orientations, provide an improvement in the accuracy of sensor readings of embedded sensors of the computing device.

FIG. 1 shows a block diagram of an example sensor validation system 100 for ambient light sensor validation. The system 100 includes a computing device 102 that includes processing circuitry 104 and memory 106 storing instructions for a sensor validation application 108 that, during execution by the processing circuitry 104, causes the processing circuitry 104 to perform the sensor validation process. The computing device 102 can be any type of device, including a personal computer, a laptop, a smartphone, a tablet device, etc. The computing device 102 includes an ambient light sensor system 110 with sensors to be validated. In the depicted example, the ambient light sensor system 110 includes an ambient light intensity sensor 112 for measuring ambient light intensity (e.g., LUX) and an ambient color sensor 114 for measuring ambient color (e.g., color temperature). Any other sensors can also be implemented.

The computing device 102 further includes a proximity detection system 116 for detecting the presence of one or more external devices 118. The external device 118 can be any device with an ambient light sensor system 120 from which sensor data can be used for the sensor validation process by the computing device 102. For example, the external device 118 can be a laptop, a smartphone, tablet, or any other computing device. In the depicted example, the ambient light sensor system 120 of the external device 118 includes an ambient light intensity sensor 122 and an ambient color sensor 124. Any other sensors can also be implemented.

The proximity detection system 116 can be implemented in various ways. In some implementations, the computing device 102 detects that an external device 118 is in its vicinity by determining that the external device 118 is communicatively connected to the computing device 102. For example, the proximity detection system 116 can be implemented to determine when an external device 118 is connected to the computing device 102 through a wired or wireless connection. In a further example, the proximity detection system 116 can be implemented to detect a wireless communication protocol, including but not limited to BLUETOOTH®, ultra-wideband (UWB) protocol, and various radio-based communication technologies. Another detection process includes determining whether the external device 118 is connected to and using the same WI-FI® address as the computing device 102.

In some implementations, the computing device 102 detects that an external device 118 is in its vicinity by determining that the external device 112 is within a predetermined distance from the computing device 102. For example, the proximity detection system 116 can be implemented to determine the position and/or distance of the external device 118 from the computing device 102. Various methods for determining distance can be utilized. In some implementations, the relative distance between the external device 118 and the computing device 102 is determined based at least upon a wireless communication technology, such as but not limited to WI-FI®, BLUETOOTH®, UWB, and various radio-based communication technologies. Other methods include the use of data from components such as a microphone (audio data), camera (image data), and proximity sensors.

Upon detecting that the external device 118 is in the vicinity of the computing device 102, information describing sensor data from the ambient light sensor system 120 of the external device 118 can be used perform correction (e.g., replace or augment) of sensor data of the ambient light sensor system 110 of the computing device 102. Information describing sensor data of the ambient light sensor system 120 of the external device 118 can be received by the computing device 102 through various methods. In the depicted example, the external device 118 is communicatively coupled to the computing device 102, and the information can be sent directly (e.g., through a wired or wireless connection). In other implementations, one or more devices serve as an intermediary for the transmission of information between the computing device 102 and the external device 118.

In some implementations, information describing sensor data from the ambient light sensor system 120 of the external device 118 is utilized in the sensor validation process upon determining that the sensor data from the ambient light sensor system 110 of the computing device 102 is unreliable. The extent of the unreliability of the sensor readings of the ambient light sensor system 110 of the computing device 102 can determine how the information from the external device 118 is utilized (e.g., whether to replace or augment the sensor data of the ambient light sensor system 104 of the computing device 102).

Determining the unreliability of the sensor data of the ambient light sensor system 110 of the computing device 102 can be performed in various ways. In some implementations, sensor data of the ambient light sensor system 110 of the computing device 102 are determined to be unreliable due to design limitations of the computing device 102. For example, if the computing device 102 is designed with an OLED panel, the ambient light sensor system 110 may include sensors embedded underneath the OLED panel, which may result in less accurate sensor readings compared to other placements. In such cases, information from an external device 118 with more reliable sensor readings may be used as complementary data to perform correction of the sensor data of the ambient light sensor system 110 of the computing device 102.

In some implementations, unreliability of the sensor data of the ambient light sensor system 110 of the computing device 102 is determined based at least upon the orientation of the ambient light sensor system 110. Orientations indicating that sensors of the ambient light sensor system 110 are not sensing ambient light corresponding to the user's viewpoint can be used to indicate that the sensor readings are unreliable. For example, an orientation indicating that the ambient light sensor system 110 is directed downward or upward can mean that the sensors are undersaturated or oversaturated (depending on the location of the light source) compared to the user's viewpoint.

In the depicted example, the computing device 102 includes an orientation detection system 126 for determining the orientation of the ambient light sensor system 110 of the computing device 102. Similarly, the external device 118 includes an orientation detection system 128 for determining the orientation of the ambient light sensor system 116 of the external device 112. Orientation of an ambient light sensor system can be determined using various methods. For example, an orientation of an ambient light sensor system can be determined using a magnetometer, a gyroscope, an accelerometer, a barometer, etc.

In some implementations, unreliability of the sensor data of the ambient light sensor system 110 of the computing device 102 is determined upon verifying that sensors of the ambient light sensor system 110 are blocked. Various methods can be utilized to determine aperture blocking of the sensors. Generally, various types of different sensors are often co-located and implemented in computing devices as part of a sensor package. For example, ambient light sensors are often co-located with proximity sensors, cameras, and other types of sensors. As such, the use of such co-located sensors provides a convenient tool for determining aperture blocking of the ambient light sensor. A proximity sensor using infrared technology, for example, can be utilized to determine aperture blocking. Another example includes the use of image data from a camera to determine aperture blocking.

In some implementations, information from the external device 118 is used if sensor data from the external device 118 is determined to be reliable. Determining reliability of the sensor data from the external device 118 can be performed using various methods. One example method includes using information describing the orientation of the ambient light sensor system 120 of the external device 118 (e.g., if the ambient light sensor system 120 of the external device 112 is determined to be at an appropriate orientation indicative of an accurate ambient light reading). Another example method includes determining that the relative distance of the external device 118 to the computing device 102 is within a predetermined threshold. In some implementations, the relative distance is used to determine the amount of influence the information from the external device 118 has in the correction of the sensor data of the ambient light sensor system 110 of the computing device 102. For example, a weighted formula can be applied where information from an external device 118 that is closer to the computing device 102 is weighted higher than information from an external device 118 that is farther. These considerations allow for improved accuracy in the sensor data correction process.

The information describing sensor data of the ambient light sensor system 120 of the external device 118 can be used by the computing device 102 in various ways. For example, the information can be used to replace or augment the sensor data of the ambient light sensor system 110 of the computing device 102, which can be used to change display settings (e.g., brightness, color, saturation, etc.) of a display 130 of the computing device 102. In some implementations, the information is used to change display settings of an external display 132 communicatively connected to the computing device 102. The computing device 102 can store information from the external device 118, such as information describing the orientation and/or the sensor data of the ambient light sensor system 120. The stored information can be utilized in future sensor validation steps. For example, if the sensor data from the external device 118 is determined to be unreliable in a future sensor validation step (e.g., the ambient light sensor system 120 of the external device 118 is blocked or is in a different orientation indicative of unreliable sensor date), then the stored information can be used to provide more accurate sensor data.

How information from the external device 118 is utilized can depend on several factors. For example, if the ambient light sensor 110 of the computing device 102 is determined to be partially unreliable, the information from the external device 118 can be used to augment and/or validate the sensor readings of the ambient light sensor 110 of the computing device 102. If the ambient light sensor 110 of the computing device 102 is determined to be unreliable past a predetermined threshold, the information can be used to replace the sensor data of the computing device 102. Examples of such scenarios include when the computing device 102 is a laptop with a lid that is closed/partially closed such that the ambient light sensor system 110 is unable to reliably measure the ambient light. In some implementations, the orientation detection system 126 is utilized to determine the state of the laptop lid. Another example scenario includes when the ambient light sensor aperture is blocked.

Figure 2:
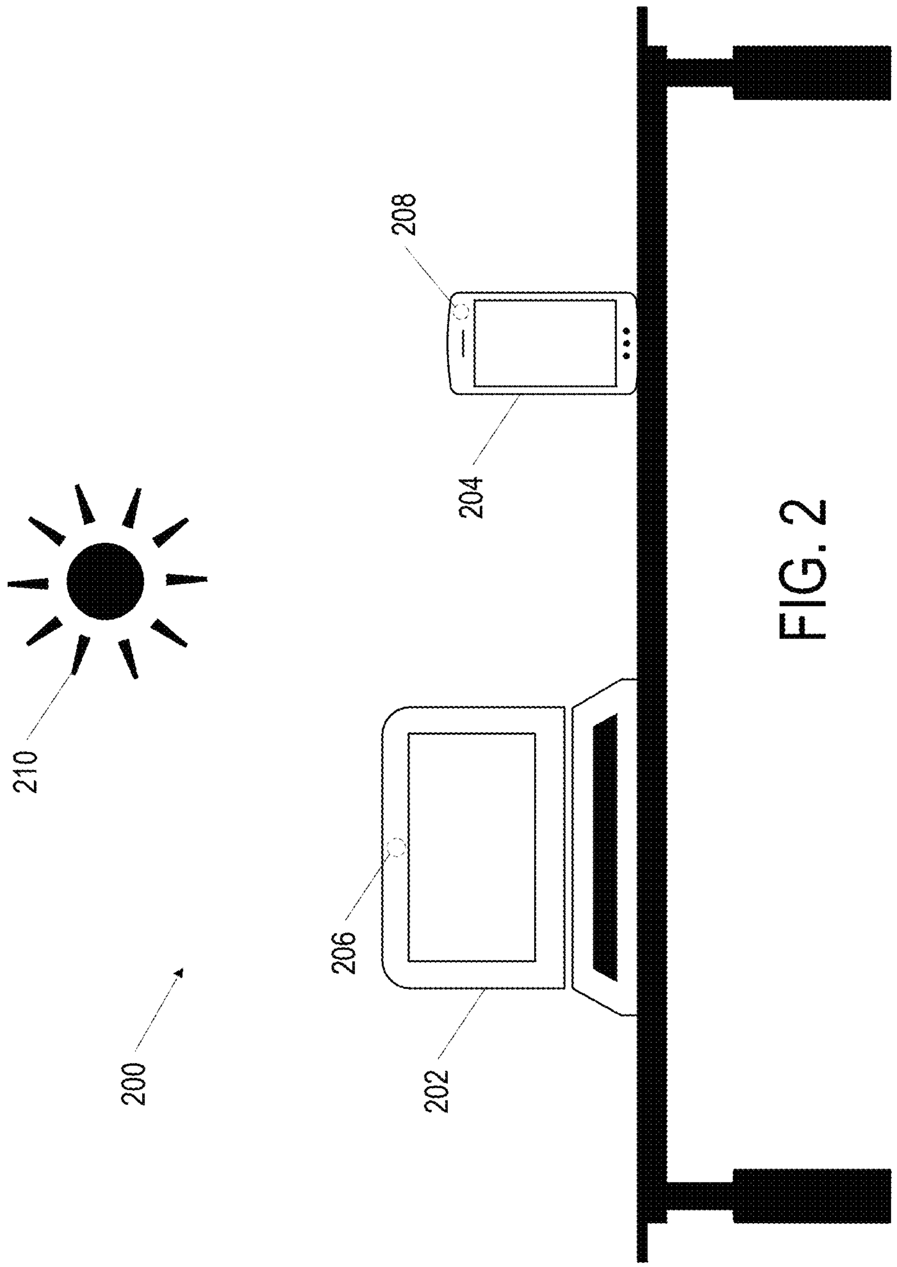
FIG. 2 shows a schematic depiction of an example sensor validation system including a computing device and an external device, which can be implemented using the system of FIG. 1.

FIG. 2 shows a schematic depiction of an example sensor validation system 200 including a computing device 202 and an external device 204. In the depicted system 200, the computing device 202 is a laptop, and the external device 204 is a smartphone. Other types of devices can be implemented. For example, a laptop can be implemented as the external device 204. Each of the devices 202, 204 includes an ambient light sensor system 206, 208 for measuring ambient light produced by a light source 210. Different light sources, including both natural and artificial lighting, can result in different lighting conditions that can affect the way the ambient light sensor systems 206, 208 accurately senses the ambient light with respect to the user's viewpoint. For example, different light bulbs can have different color temperatures. Some light bulb shapes may act as more of a point light source while other shapes may be more of a linear light source.

As the computing device 202 and the external device 204 are mobile devices, the orientations of their ambient light sensor systems 206, 208 can vary across typical use cases. For example, the laptop lid of the computing device 202 can be in various positions, and the smartphone external device 204 can be placed in various positions (e.g., faced up on a table, on a phone stand, etc.). Different orientations and relative orientations between the two devices 202, 204 can result in different sensor validation processes and results.

Figure 3B:
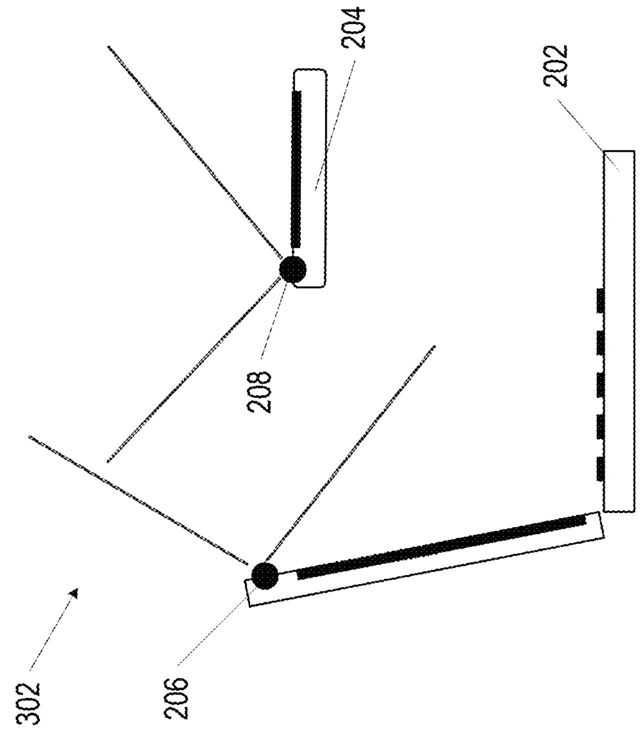
FIGS. 3A and 3B show profile views of different relative orientations of an example sensor validation system including a computing device and an external device.
Figure 3A:
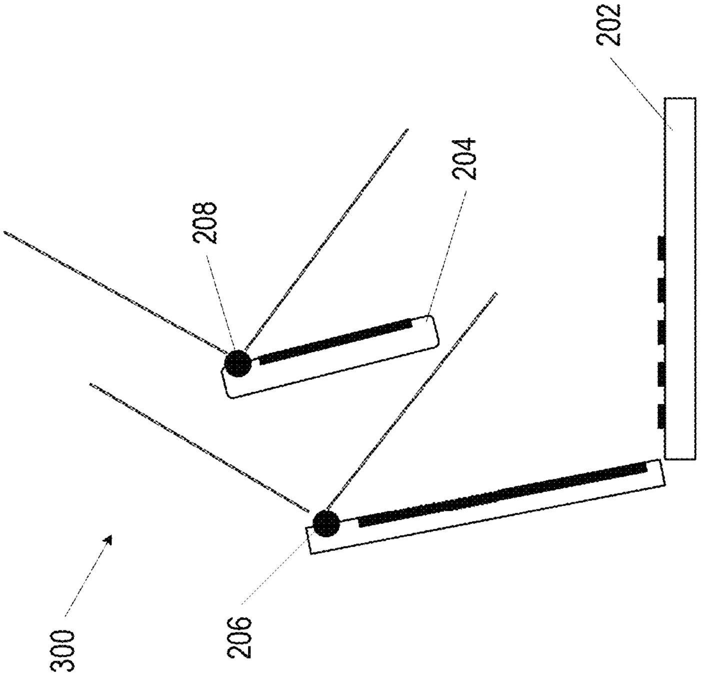

FIGS. 3A and 3B show profile views of two configurations 300, 302 with different relative orientations of an example sensor validation system including a computing device 202 and an external device 204. The example sensor validation system depicted in FIGS. 3A and 3B can be implemented similarly as the system of FIG. 2, where each of the devices 202, 204 includes an ambient light sensor system 206, 208 for measuring ambient light produced by a light source (not shown). FIG. 3A depicts a first configuration 300 with a first relative orientation. As shown, both the ambient light sensor systems 206, 208 of the computing device 202 and the external device 204 are facing the same direction. In some implementations, such a relative orientation between the two sensor systems 206, 208 indicates that sensor data of the ambient light sensor system 208 from the external device 204 can be relied upon for performing correction of sensor data of the ambient light sensor system 206 of the computing device 202 (e.g., if the sensor data of the ambient light sensor system 206 of the computing device 202 is unreliable due to malfunctioning sensor(s), design limitations, etc.).

Different reliability metrics can be applied to individual sensors of the ambient light sensor systems 206, 208. For example, different relative orientations may have a larger effect on reliability for ambient light intensity sensors compared to ambient color sensors. FIG. 3B depicts a second configuration 302 with a second relative orientation. As shown, the ambient light sensor systems 206, 208 of the computing device 202 and the external device 204 are facing the different directions, with the ambient light sensor system 208 of the external device 204 facing upwards. In such cases, use of sensor data from the ambient light sensor system 208 of the external device 202 may be unreliable for correction of ambient intensity readings. However, the sensor data from the external device 204 can still be relied upon to correct for ambient color readings (assuming that both devices 202, 204 are in vicinity of one another under the same ambient light color).

Figure 4:
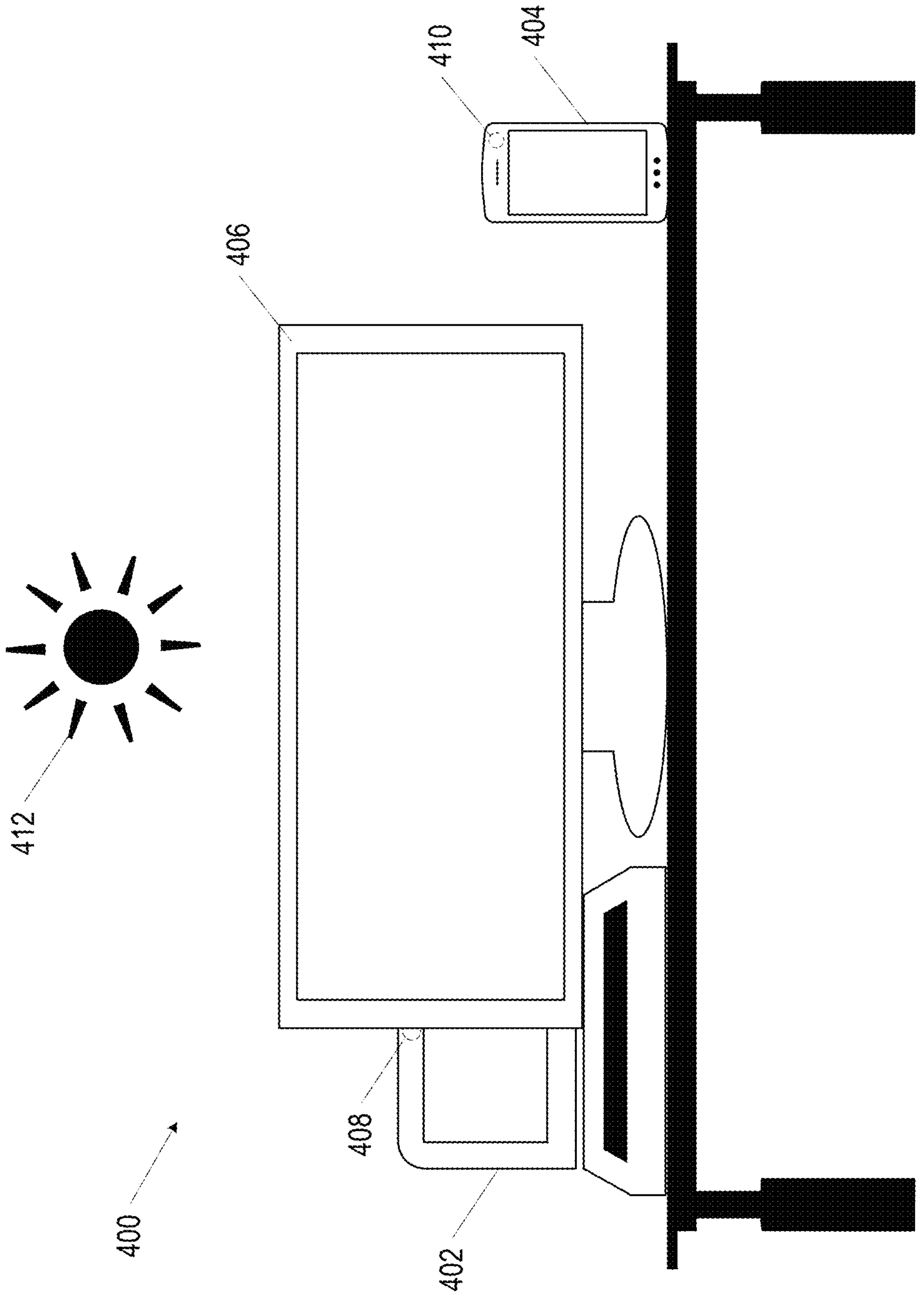
FIG. 4 shows a schematic depiction of an example sensor validation system including a computing device, external device, and an external display, which can be implemented using the system of FIG. 1.

FIG. 4 shows a schematic depiction of an example sensor validation system 400 including a computing device 402, external device 404, and an external display 406. In the depicted example system 400, the computing device 402 is a laptop, and the external device 404 is a smartphone. Other types of devices can be implemented. Each of the devices 402, 404 includes an ambient light sensor system 408, 410 for measuring ambient light produced by a light source 412. In the depicted example, the external display 406 does not include an ambient light sensor system and is used as a display in connection with the computing device 402. In such cases, the computing device 402 provides ambient light sensor data for controlling display settings of the external display 406. However, as shown, the devices are positioned such that the external display 406 is blocking the aperture of the ambient light sensor system 408 of the computing device 402. As such, sensor data from the ambient light sensor system 408 of the computing device 402 may be unreliable, and external device 404 is used in a sensor validation process for the computing device 402.

FIGS. 5A-5E show profile views of five configurations respectively at 500, 502, 504, 506, 508 of a computing device 402, an external device 404, and an external display 406. Each of configurations 500, 502, 504, 506, 508 comprises a different relative orientation and aperture blocking state of the computing device 402, external device 404, and an external display 406. The example sensor validation system depicted in FIGS. 5A-5E can be implemented similarly as the system of FIG. 4, where the computing device 402 and the external device 404 each includes an ambient light sensor system 408, 410 for measuring ambient light produced by a light source (not shown).

Figure 5A:
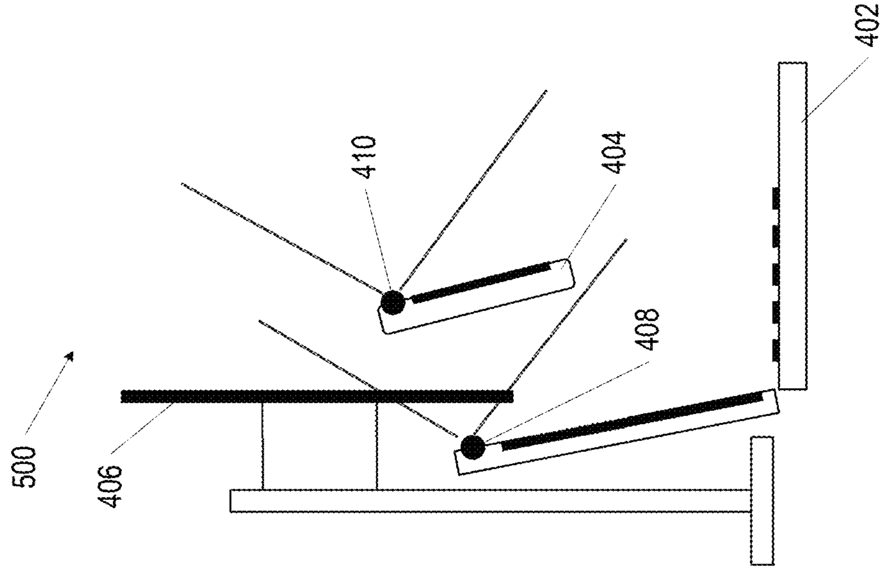
FIGS. 5A-5E show profile views of different relative orientations and aperture blocking of an example sensor validation system including a computing device, external device, and an external display.

FIG. 5A depicts a first configuration 500 in which the ambient light sensor system 408 of the computing device 402, the ambient light sensor system 410 of the external device 404, and the external display 406 face a similar direction. The aperture of the ambient light sensor system 408 of the computing device 402 is blocked by the external display 406. In some implementations, such a relative orientation between the two sensor systems 408, 410 indicates that sensor data of the ambient light sensor system 410 from the external device 404 can be relied upon for performing correction of sensor data of the ambient light sensor system 408 of the computing device 402. As the aperture of the ambient light sensor system 408 of the computing device 402 is blocked, sensor data from the ambient light sensor system 410 from the external device 404 can be used advantageously for performing correction of sensor data for the computing device 402.

Figure 5B:
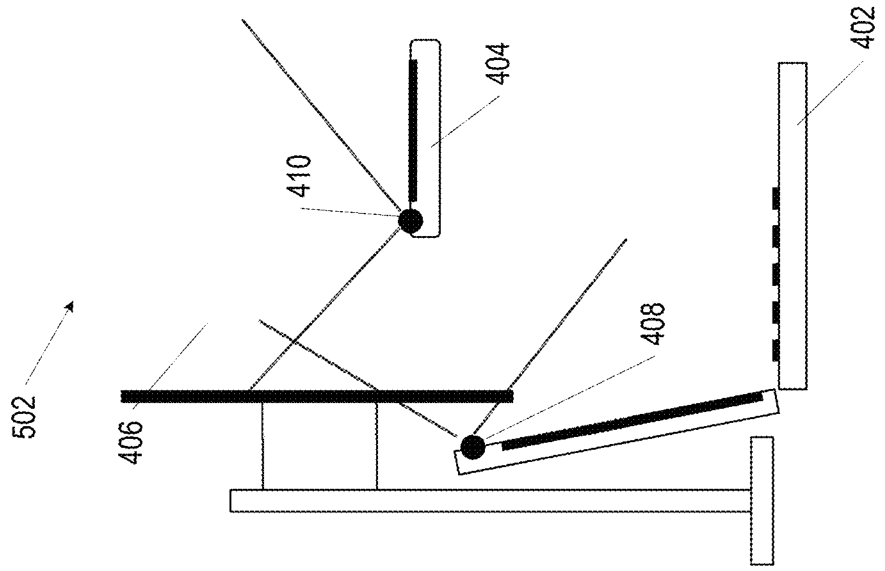

FIG. 5B depicts a second configuration 502 in which the ambient light sensor system 408 of the computing device 402 and the external display 406 face a similar direction but different from that of the ambient light sensor system 410 of the external device 404. The aperture of the ambient light sensor system 408 of the computing device 402 is blocked by the external display 406. Although such a relative orientation between the two sensor systems 408, 410 may indicate that sensor data of the ambient light sensor system 410 from the external device 404 is unreliable, such sensor data may still be used to partially correct for the ambient light intensity reading of the blocked ambient light sensor system 408 of the computing device 402. Sensor data of the ambient light sensor system 410 from the external device 404 for correction of ambient color readings can still be relied upon.

Figure 5C:
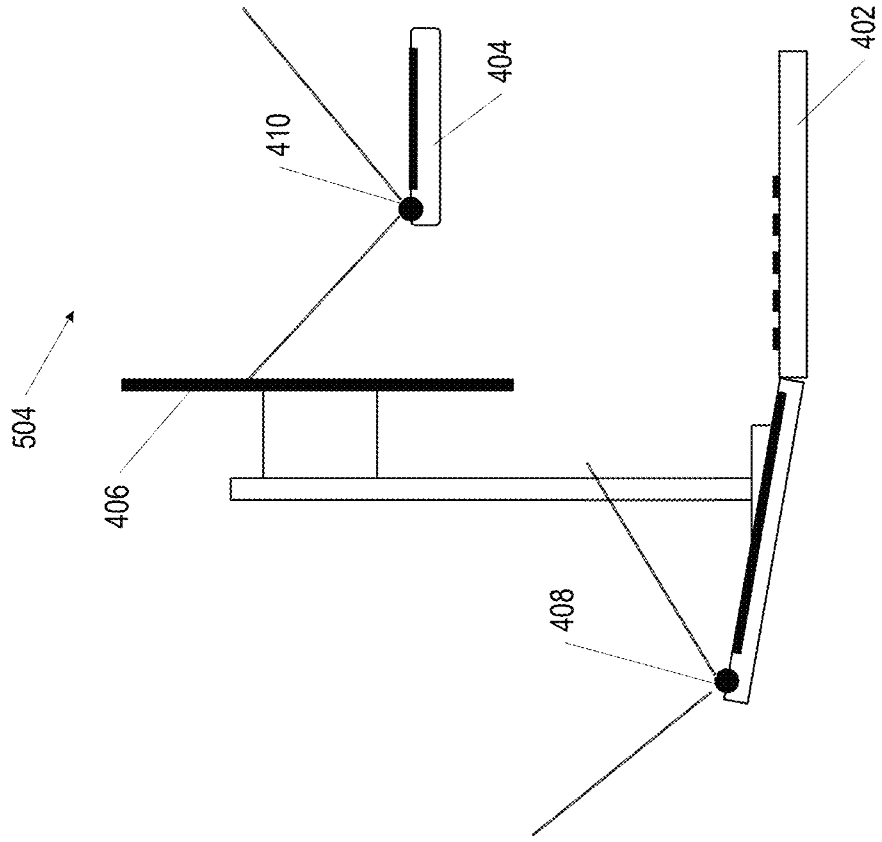

FIG. 5C depicts a third configuration 504 in which the ambient light sensor system 408 of the computing device 402 and the ambient light sensor system 410 of the external device 404 face a similar direction but different from that of the external display 406. The aperture of the ambient light sensor system 408 of the computing device 402 is somewhat blocked by the external display 406. The direction in which the external display 406 is facing coincides with the user's viewing experience, which is different from the direction in which the ambient light sensor system 408 of the computing device 402 is facing. As such, the orientation of the ambient light sensor system 408 of the computing device 402 is such that its sensor data may be unreliable, with respect to the user's viewpoint. In such a configuration, sensor data from the ambient light sensor system 410 of the external device 404 can still be reliable for correction of ambient color readings and the partial correction of ambient light intensity readings for the computing device 402.

Figure 5D:
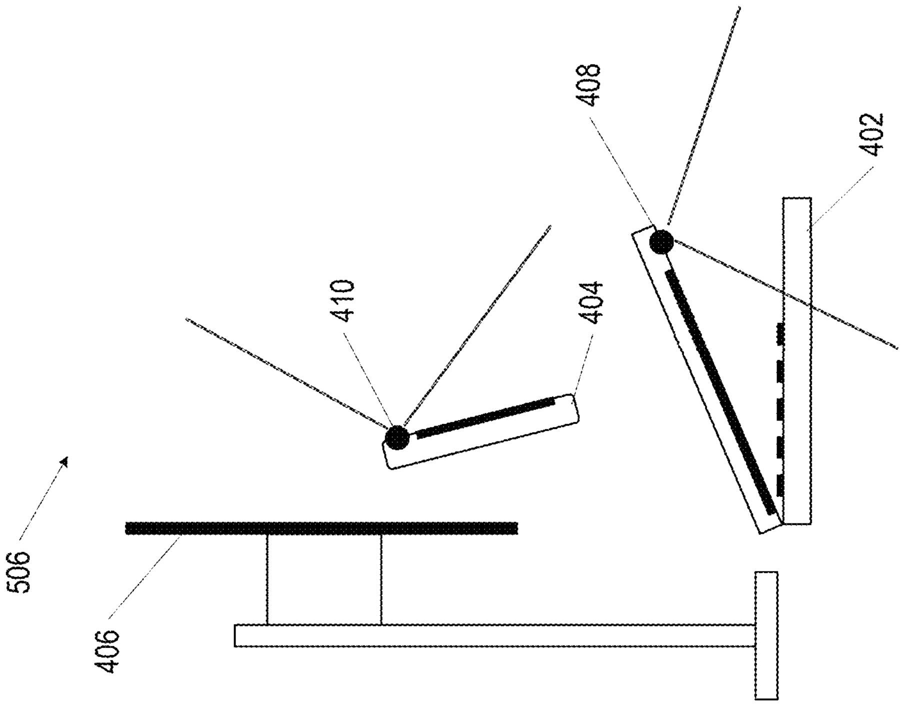

FIG. 5D depicts a fourth configuration 506 in which the laptop lid of the computing device 402 is partially closed, and the ambient light sensor system 410 of the external device 404 and the external display 406 face a similar direction. As the laptop lid of the computing device 402 is partially closed, sensor readings from the ambient light sensor system 408 of the computing device 402 may be unreliable and unusable for adjusting the display settings of the external display 406 in accordance with the ambient lighting. Since the ambient light sensor system 410 of the external device 404 and the external display 406 face a similar direction, sensor data from the ambient light sensor system 410 of the external device 404 can be reliable in providing accurate ambient light intensity and ambient color readings, which can be used to adjust the display settings of the external display 406 accordingly.

Figure 5E:
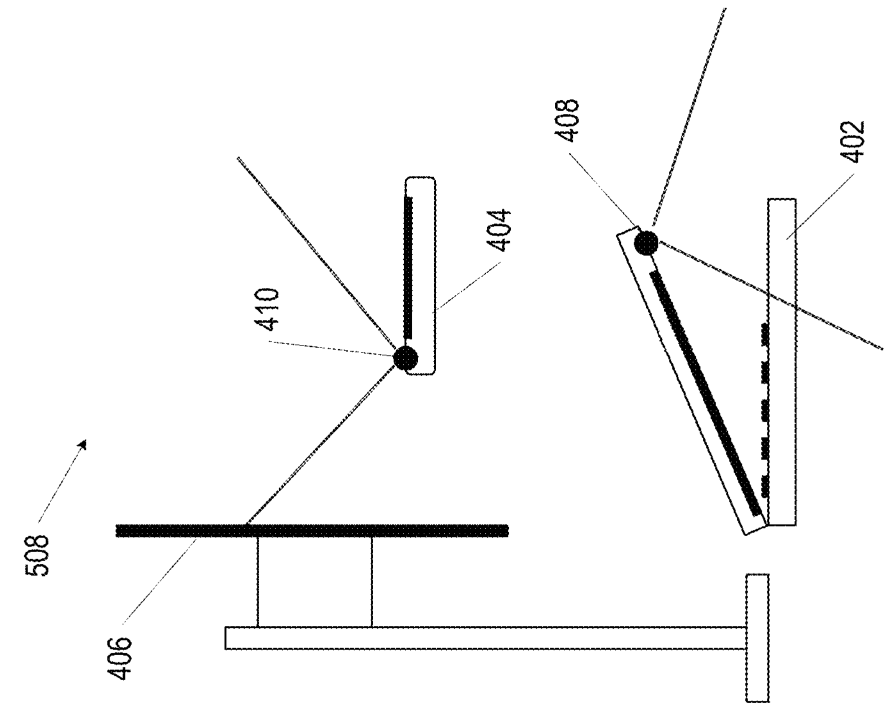

FIG. 5E depicts a fifth configuration 508 in which the laptop lid of the computing device 402 is partially closed, and the ambient light sensor system 410 of the external device 404 and the external display 406 face different directions. Similar to the configuration 506 of FIG. 5D, the partially closed laptop lid of the computing device 402 results in unreliable sensor readings for adjusting the display settings of the external display 406. However, the ambient light sensor system 410 of the external device 404 and the external display 406 face different directions, so sensor readings from the ambient light sensor system 410 of the external device 404 are not fully reliable for the correction of ambient light intensity readings. Still, such sensor data can still be utilized to partially correct for ambient light intensity readings and to correct for ambient color readings.

FIGS. 3A, 3B, and 5A-5E depict various different sensor validation systems and example scenarios of different relative orientations and aperture blocking. Different scenarios resulting in different reliability metrics for the sensor readings of ambient light sensor systems for a computing device and an external device can have different consequences on how sensor data from the external device is utilized by the computing device to validate its sensor data. Furthermore, sensor validation systems can be implemented for sensors other than ambient light sensors.

Figure 6:
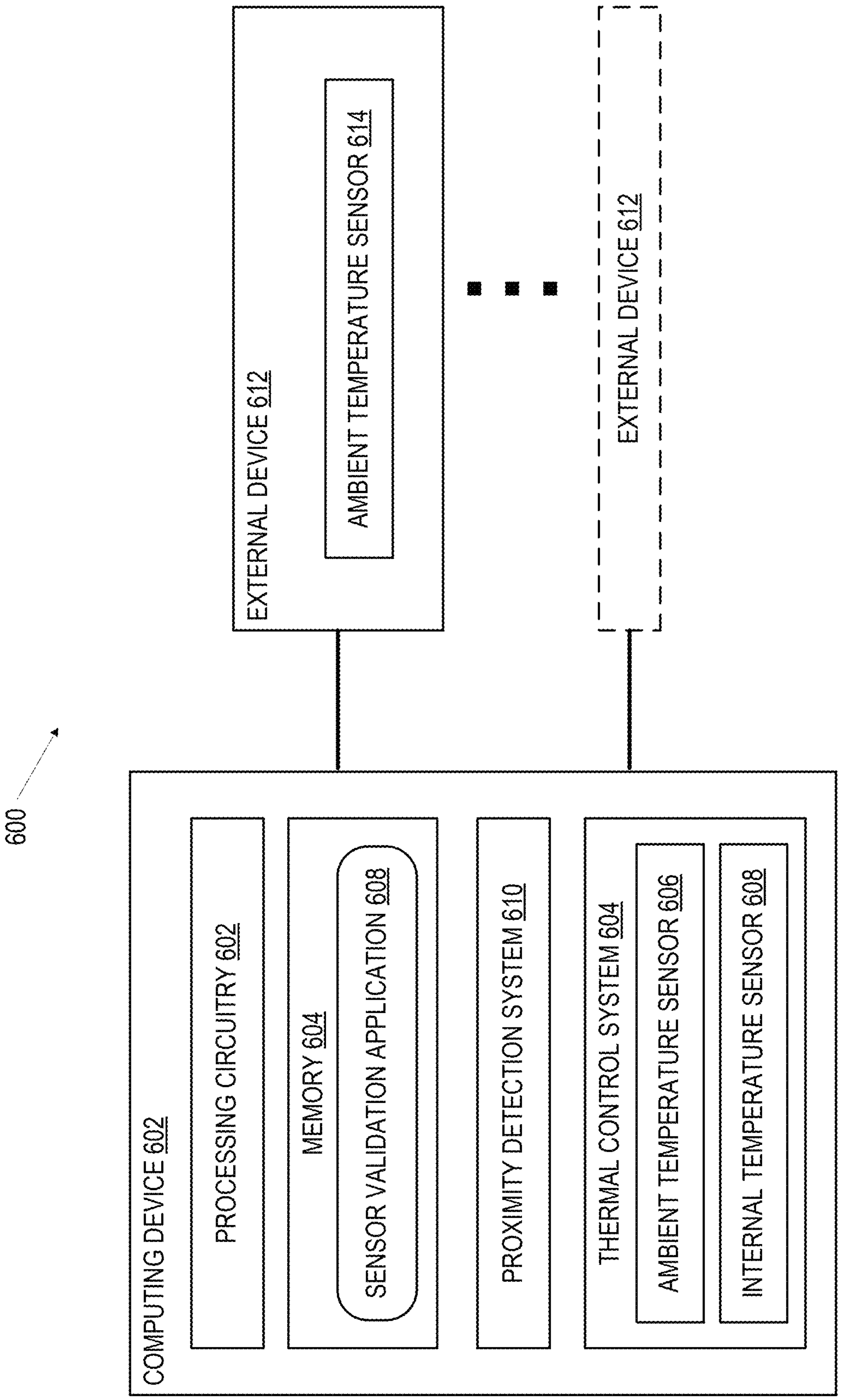
FIG. 6 shows a block diagram of an example sensor validation system for ambient temperature sensor validation.

FIG. 6 shows a block diagram of an example sensor validation system 600 for ambient temperature sensor validation. The system 600 includes a computing device 602 that includes processing circuitry 604 and memory 606 storing instructions for a sensor validation application 608 that, during execution by the processing circuitry 604, causes the processing circuitry 604 to perform the sensor validation process. The computing device 602 can be any type of device, including a personal computer, a laptop, a smartphone, a tablet device, etc.

The computing device 602 includes thermal control system 604 for controlling performance of the computing device 602. The thermal control system 604 includes an ambient temperature sensor 606 and an internal temperature sensor 608. For example, the thermal control system 604 can be configured to throttle performance of the computing device 602 based at least upon an internal temperature threshold. In some implementations, the internal temperature threshold is a function of the ambient temperature. As the computing device 602 can generate considerable amounts of internal heat, such as when the computing device 602 is under a high working load, the ambient temperature sensor 606 may provide unreliable ambient temperature readings due to interference from heat generated by the computing device 602.

The computing device 102 further includes a proximity detection system 610 for detecting the presence of one or more external devices 612. The proximity detection system 610 can be implemented in various ways, including those described above with respect to the proximity detection system 116 of FIG. 1. The external device 612 can be any type of device, including a personal computer, a laptop, a smartphone, a tablet device, etc. The external device 612 includes an ambient temperature sensor 614 from which sensor data can be used to correct the sensor data of the ambient temperature sensor 606 of the computing device 602.

Upon detecting that the external device 612 is in the vicinity of the computing device 602, information describing sensor data from the ambient temperature sensor 614 of the external device 612 can be used perform correction (e.g., replace or augment) of sensor data of the ambient temperature sensor 606 of the computing device 602. Correction of the sensor data of the ambient temperature sensor 606 of the computing device 602 can cause the computing device 602 to adjust its internal temperature threshold to reflect the corrected ambient temperature reading. Information describing sensor data of the ambient temperature sensor 614 of the external device 612 can be received by the computing device 602 through various methods. In the depicted example, the external device 612 is communicatively coupled to the computing device 602, and the information can be sent directly (e.g., through a wired or wireless connection). In other implementations, one or more devices serve as an intermediary for the transmission of information between the computing device 602 and the external device 612.

The sensor validation process for correction sensor data of the ambient temperature sensor 606 of the computing device 602 can be performed in various ways. In some implementations, the sensor validation process is implemented to utilize information describing sensor data from the ambient temperature sensor 614 of the external device 612 to perform sensor validation upon determining that the sensor data of the ambient temperature sensor 606 of the computing device 602 is unreliable. Determining that the sensor data of the ambient temperature sensor 606 of the computing device 602 is unreliable can be performed in various ways. In some implementations, such sensor data is determined to be unreliable upon determining that an internal temperature of the computing device 602 is above a predetermined threshold using the internal temperature sensor 608.

In some implementations, the sensor validation process utilizes information describing sensor data from the ambient temperature sensor 614 of the external device 612 to perform sensor validation upon determining that said sensor data is reliable. Determining reliability of the ambient temperature sensor 614 of the external device 612 can be performed in various ways. For example, reliability of the ambient temperature sensor 614 of the external device 612 can be determined by verifying that the external device 612 is operating in a low power mode, low load performance, sleep mode, hibernating, etc. Such modes of operation indicate that the external device 612 is generating low heat and, thus, will not interfere with the ambient temperature reading of the external device 612.

In some implementations, reliability of sensor data from the ambient temperature sensor 614 of the external device 612 is determined based at least upon the relative distance between the computing device 602 and the external device 612. For example, the closer the two devices are together, the more likely that the ambient temperature for both devices will be similar. In some implementations, the relative distance between the computing device 602 and the external device 612 is determined and used in a weighted formula for determining the impact of the sensor data of the ambient temperature sensor 614 of the external device 612 on the sensor validation process.

Figure 7:
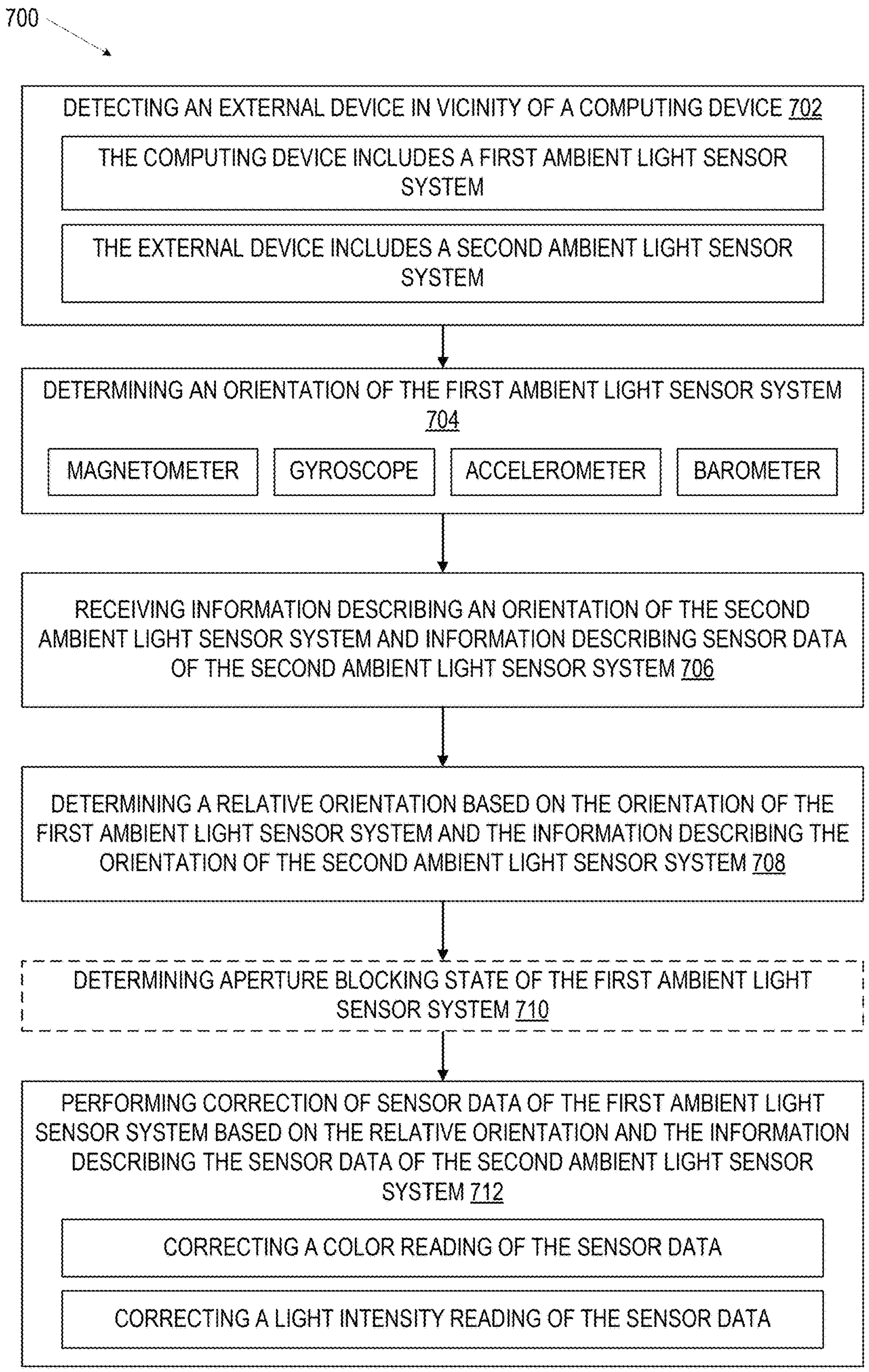
FIG. 7 shows a flow diagram of an example method for sensor validation for ambient light sensor validation using an external device, which can be implemented using the system of FIG. 1.

FIG. 7 shows a flow diagram of an example method 700 for sensor validation for ambient light sensor validation using an external device. The method 700 includes, at step 702, detecting an external device in vicinity of a computing device. The computing device includes a first ambient light sensor system on which the sensor validation process is performed. The external device includes a second ambient light sensor system. Ambient light sensor systems can be implemented using any type and number of light sensors. In some implementations, the ambient light sensor system includes an ambient light intensity sensor and an ambient color sensor.

Detecting that the external device is in vicinity of the computing device can be performed in various ways. In some implementations, detecting the external device in vicinity of the computing device includes determining that the external device is communicatively connected to the device. In some implementations, a relative distance between the external device and the computing device is determined. Methods for determining the relative distance between the two devices can include but are not limited to the use of audio data, camera data, and wireless communication technologies. The relative distance between the two devices can be used for various purposes. In some implementations, detecting that the external device is in vicinity of the computing device includes determining that the relative distance between the two devices is within a predetermined threshold.

The method 700 includes, at step 704, determining an orientation of the first ambient light sensor system. The orientation of the first ambient light sensor system can be determined using various methods. Example methods include the use of a magnetometer, a gyroscope, an accelerometer, a barometer, etc. Orientation of the first ambient light sensor system can be used to determine reliability of its sensor data. For example, an orientation indicating that the first ambient light sensor system is oriented differently than the display that the user is viewing can result in different sensor readings that are not associated to the user's viewpoint.

The method 700 includes, at step 706, receiving information describing an orientation of the second ambient light sensor system and information describing sensor data of the second ambient light sensor system. Information from the external device can be received by the computing device through various methods. In some implementations, the external device is communicatively coupled to the computing device, and the information can be sent directly (e.g., through a wired or wireless connection). In other implementations, one or more devices serve as an intermediary for the transmission of information between the computing device and the external device.

The method 700 includes, at step 708, determining a relative orientation based at least upon the orientation of the first ambient light sensor system and the information describing the orientation of the second ambient light sensor system. Different relative orientations may result in different sensor data corrections. For example, similar orientations between the two devices can indicate that both light intensity (LUX) and color can be used in the correction of the sensor data of the first ambient light sensor system. Larger relative orientations can indicate that light intensity readings from the external can be unreliable.

The method 700 optionally includes, at step 710, determining the aperture blocking state of the first ambient light sensor system. Various methods can be utilized to determine aperture blocking of the sensors. In some implementations, a proximity sensor using infrared technology can be utilized to determine aperture blocking. Another method includes the use of image data from a camera to determine aperture blocking.

The method 700 includes, at step 712, performing correction of sensor data of the first ambient light sensor system based at least upon the relative orientation and the information describing the sensor data of the second ambient light sensor system. In some implementations, performing correction of the sensor data of the first ambient light sensor system includes correction a color reading of the sensor data. In some implementations, performing correction of the sensor data of the first ambient light sensor system includes correction a light intensity reading of the sensor data. For example, the method 700 can include performing correction of the light intensity reading of the sensor data upon determining that the relative orientation satisfies a predetermined criterion, such as being below a predetermined threshold. This provides improved accuracy in the sensor data correction process. For example, a relative orientation that is too large may indicate that the external device is facing in a direction too different from the computing device such that its light intensity reading is weakly or non-correlated to the sensors of the computing device.

Performing correction of the sensor data of the first ambient light sensor system can be implemented in various ways. In some implementations, the correction of the sensor data includes the use of information from the external device as complementary information to enhance the accuracy of the sensor data. In some implementations, performing correction of the sensor data of the first ambient light sensor system is based at least upon the relative distance of the external device to the computing device. The correction can be used to provide instructions to adjust the display settings of a display in accordance with the corrected sensor data. The display can be an internal display of the computing device or an external display communicatively coupled to the computing device. In some implementations, the computing device stores the information describing the orientation of the second ambient light sensor system and the information describing the sensor data of the second ambient light sensor system. The stored information can be used to perform future corrections. For example, upon determining that the current sensor readings of the second ambient light sensor system are unreliable, the stored information can be used to perform the corrections to the sensor data of the first ambient light sensor system.

Figure 8:
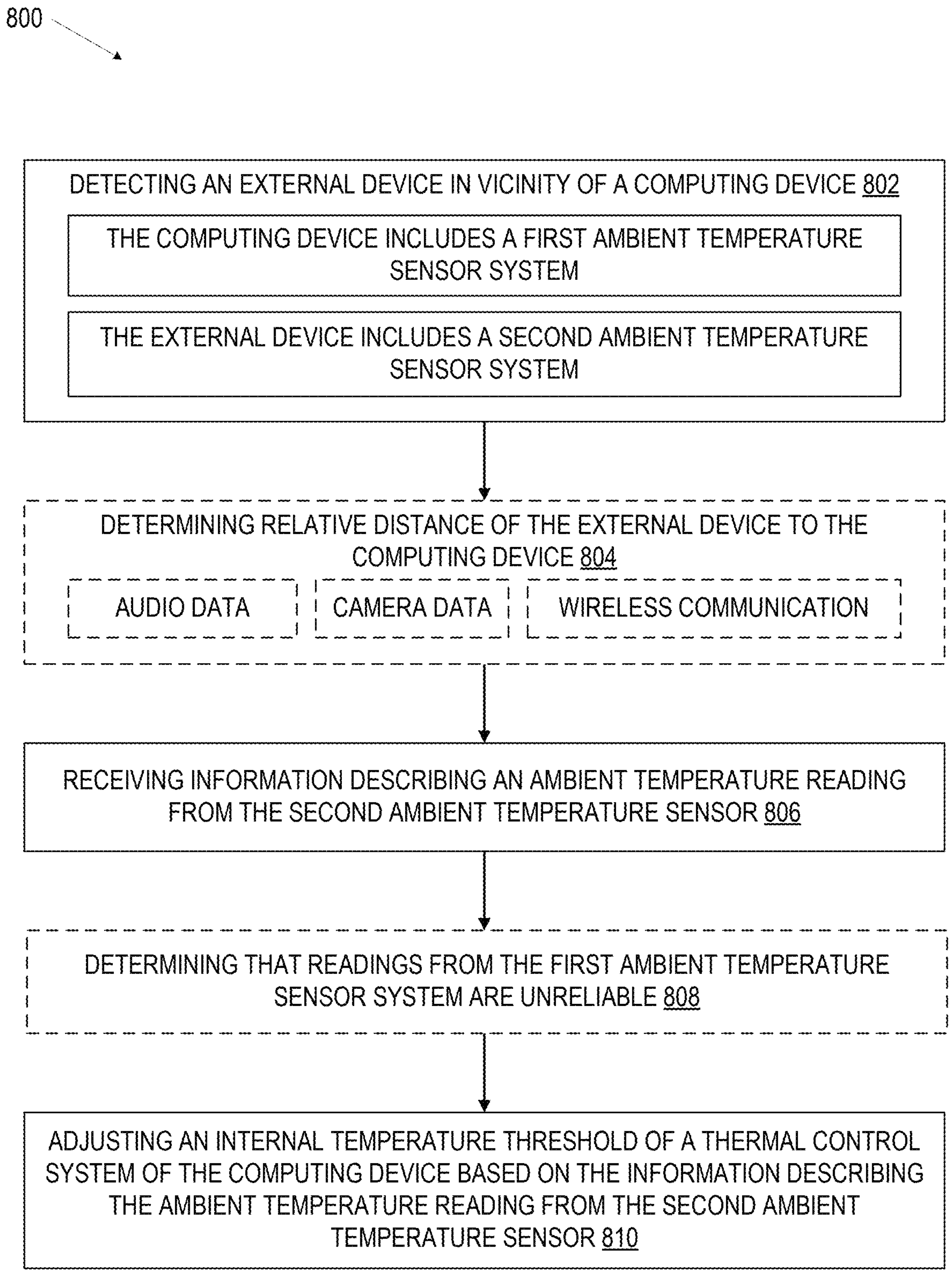
FIG. 8 shows a flow diagram of an example method for sensor validation for ambient temperature sensor validation using an external device, which can be implemented using the system of FIG. 6.

FIG. 8 shows a flow diagram of an example method 800 for sensor validation for ambient temperature sensor validation using an external device. The method 800 includes, at step 802, detecting an external device in vicinity of a computing device. The computing device includes a first ambient temperature sensor system on which the sensor validation process is performed. The external device includes a second ambient temperature sensor system. Detecting that the external device is in vicinity of the computing device can be performed in various ways, including those discussed above with respect to FIG. 7.

The method 800 optionally includes, at step 804, determining relative distance of the external device to the computing device. Determining the relative distance of the external device to the computing device can be performed in various ways. Example techniques include the use of audio data, camera data, and wireless communication technologies. The relative distance between the two devices can be utilized in various ways. For example, the relative distance can be used as a weighted factor to determine the reliability the ambient temperature reading of the second ambient temperature sensor system. In some implementations, a smaller relative distance indicates a higher reliability of the ambient temperature reading of the second ambient temperature sensor system as the devices are in close proximity and should be affected by ambient temperature similarly.

The method 800 includes, at step 806, receiving information describing an ambient temperature reading from the second ambient temperature sensor. Information from the external device can be received by the computing device through various methods, including those discussed above with respect to FIG. 7.

The method 800 optionally includes, at step 808, determining that readings from the first ambient temperature sensor system are unreliable. Determining that the readings of the first ambient temperature sensor of the computing device 602 is unreliable can be performed in various ways. In some implementations, the readings are determined to be unreliable upon determining that an internal temperature of the computing device is above a predetermined threshold.

The method 800 includes, at step 810, adjusting an internal temperature threshold of a thermal control system of the computing device based at least upon the information describing the ambient temperature reading from the second ambient temperature sensor. Adjusting the internal temperature threshold of the thermal control system can be based at least upon various factors, such as the relative distance of the external device from the computing device. In some implementations, adjusting the internal temperature threshold of the thermal control system is based at least upon the information describing that the external device is in a low power usage state. The computing device can also include an internal ambient temperature sensor that can be used to adjust the internal temperature threshold of the thermal control system (e.g., based on differences between temperature readings of the internal ambient temperature sensor and the ambient temperature sensor of the external device).

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
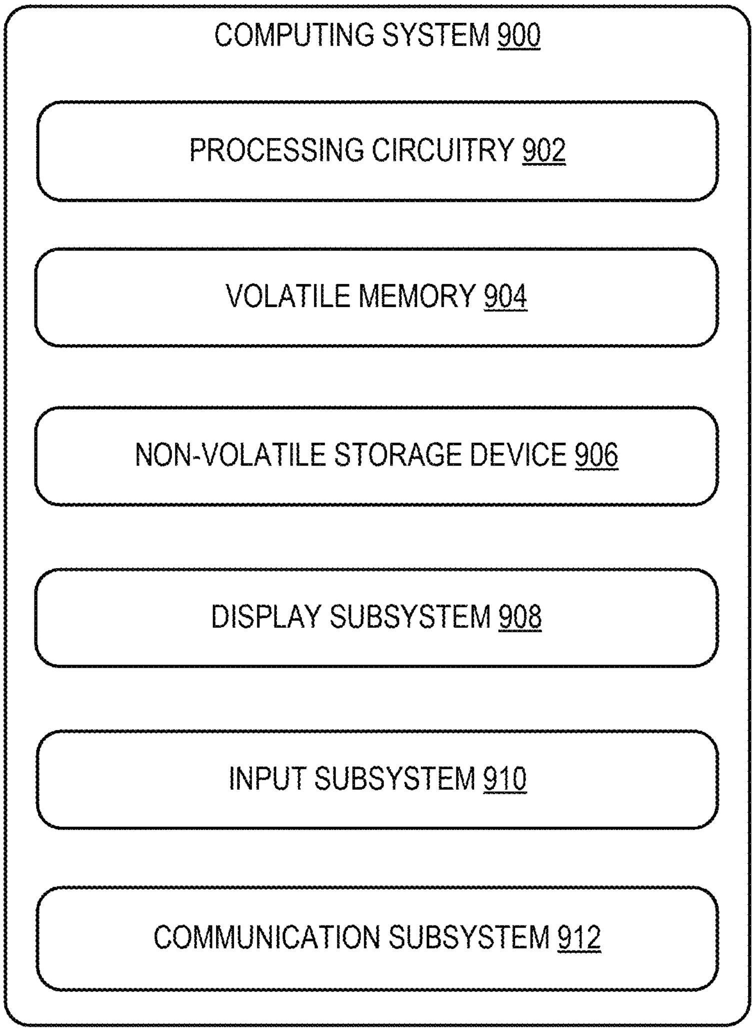
FIG. 9 shows a schematic view of an example computing system, which can be implemented in the systems of FIGS. 1 and 6.

FIG. 9 schematically shows a non-limiting embodiment of a computing system 900 that can enact one or more of the methods and processes described above. Computing system 900 is shown in simplified form. Components of computing system 900 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 900 includes processing circuitry 902, volatile memory 904, and a non-volatile storage device 906. Computing system 900 may optionally include a display subsystem 908, input subsystem 910, communication subsystem 912, and/or other components not shown in FIG. 9.

Processing circuitry typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 902 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 902.

Non-volatile storage device 906 includes one or more physical devices configured to hold instructions executable by the processing circuitry to implement the methods and processes described herein. When such methods and processes are implemented, the state of non-volatile storage device 906 may be transformed—e.g., to hold different data.

Non-volatile storage device 906 may include physical devices that are removable and/or built in. Non-volatile storage device 906 may include optical memory, semiconductor memory, and/or magnetic memory, or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by processing circuitry 902 to temporarily store information during processing of software instructions. It will be appreciated that volatile memory 904 typically does not continue to store instructions when power is cut to the volatile memory 904.

Aspects of processing circuitry 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via processing circuitry 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a GUI. As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with processing circuitry 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, camera, or microphone.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 900 to send and/or receive messages to and/or from other devices via a network such as the Internet.

The following paragraphs provide additional description of the subject matter of the present disclosure. One aspect provides a computing device comprising a first ambient light sensor system comprising an ambient light intensity sensor and an ambient color sensor; and processing circuitry and memory storing instructions that, during execution by the processing circuitry, causes the processing circuitry to detect the external device in vicinity of the computing device, wherein the external device comprises a second ambient light sensor system; determine an orientation of the first ambient light sensor system; receive information describing an orientation of the second ambient light sensor system and information describing sensor data of the second ambient light sensor system; determine a relative orientation based at least upon the orientation of the first ambient light sensor system and the information describing the orientation of the second ambient light sensor system; and perform correction of sensor data of the first ambient light sensor system based at least upon the relative orientation and the information describing the sensor data of the second ambient light sensor system. In this aspect, additionally or alternatively, the sensor data of the first ambient light sensor system comprises a light intensity reading and a color reading, and wherein performing correction of the sensor data of the first ambient light sensor comprises performing correction of the color reading; and upon determining that the relative orientation satisfies a predetermined criterion, performing correction of the light intensity reading. In this aspect, additionally or alternatively, detecting the external device comprises determining that the external device is communicatively connected to the device. In this aspect, additionally or alternatively, detecting the external device comprises determining a relative distance of the external device to the computing device. In this aspect, additionally or alternatively, the relative distance is determined using one or more of audio data, image data, or a wireless communication protocol. In this aspect, additionally or alternatively, performing correction of the sensor data of the first ambient light sensor system is further based at least upon the relative distance of the external device to the computing device. In this aspect, additionally or alternatively, the information describing the orientation of the second ambient light sensor system is determined using one or more of a magnetometer, a gyroscope, an accelerometer, or a barometer. In this aspect, additionally or alternatively, the computing device further comprises a display, wherein performing correction of the sensor data of the first ambient light sensor system comprises adjusting a display setting of the display. In this aspect, additionally or alternatively, the computing device is communicatively coupled to an external display, and wherein performing correction of the sensor data of the first ambient light sensor system comprises adjusting a display setting of the external display. In this aspect, additionally or alternatively, the instructions, during execution by the processing circuitry, further causes the processing circuitry to store the information describing the orientation of the second ambient light sensor system and the information describing the sensor data of the second ambient light sensor system; and perform future corrections using the stored information describing the orientation of the second ambient light sensor system and the stored information describing the sensor data of the second ambient light sensor system.

Another aspect includes a method, enacted on a computing device comprising a first ambient light sensor system, for validating sensors using an external device. The method comprises detecting the external device in vicinity of the computing device, wherein the external device comprises a second ambient light sensor system; determining an orientation of the first ambient light sensor system; receiving information describing an orientation of the second ambient light sensor system and information describing sensor data of the second ambient light sensor system; determining a relative orientation based at least upon the orientation of the first ambient light sensor system and the information describing the orientation of the second ambient light sensor system; and performing correction of sensor data of the first ambient light sensor system based at least upon the relative orientation and the information describing the sensor data of the second ambient light sensor system. In this aspect, additionally or alternatively, the sensor data of the first ambient light sensor system comprises a light intensity reading and a color reading, and wherein performing correction of the sensor data of the first ambient light sensor comprises: performing correction of the color reading; and upon determining that the relative orientation satisfies a predetermined criterion, performing correction of the light intensity reading. In this aspect, additionally or alternatively, detecting the external device comprises determining a relative distance of the external device to the computing device using one or more of audio data, image data, or a wireless communication protocol, and wherein performing correction of the sensor data of the first ambient light sensor system is further based at least upon the relative distance of the external device to the computing device. In this aspect, additionally or alternatively, the computing device is communicatively coupled to an external display, and wherein performing correction of the sensor data of the first ambient light sensor system comprises a display setting of the external display. In this aspect, additionally or alternatively, the method further comprises storing the information describing the orientation of the second ambient light sensor system and the information describing the sensor data of the second ambient light sensor system; and performing future corrections using the stored information describing the orientation of the second ambient light sensor system and the stored information describing the sensor data of the second ambient light sensor system.

Another aspect includes a computing device for validating sensors using an external device, the computing device comprising a thermal control system for controlling performance of the computing device based at least upon an internal temperature threshold; processing circuitry and memory storing instructions that, during execution by the processing circuitry, causes the processing circuitry to detect the external device in vicinity of the computing device, wherein the external device comprises an ambient temperature sensor; receive information describing an ambient temperature reading from the ambient temperature sensor of the external device; and adjust the internal temperature threshold of the thermal control system based at least upon the information describing the ambient temperature reading from the ambient temperature sensor of the external device. In this aspect, additionally or alternatively, the instructions, during execution by the processing circuitry, further causes the processing circuitry to detect a relative distance of the external device to the computing device, wherein adjusting the internal temperature threshold of the thermal control system is further based at least upon the detected relative distance of the external device from the computing device. In this aspect, additionally or alternatively, the relative distance is determined using one or more of audio data, image data, or a wireless communication protocol. In this aspect, additionally or alternatively, the instructions, during execution by the processing circuitry, further causes the processing circuitry to receive information describing that the external device is in a low power usage state, wherein adjusting the internal temperature threshold of the thermal control system is further based at least upon the information describing that the external device is in a low power usage state. In this aspect, additionally or alternatively, the computing device further comprises an internal ambient temperature sensor, and wherein adjusting the internal temperature threshold of the thermal control system is further based at least upon a temperature reading of the internal ambient temperature sensor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device for validating sensors using an external device, the computing device comprising:

a thermal control system for controlling performance of the computing device based at least upon an internal temperature threshold;

processing circuitry and memory storing instructions that, during execution by the processing circuitry, causes the processing circuitry to:

detect the external device in vicinity of the computing device, wherein the external device comprises an ambient temperature sensor;

determine that the ambient temperature sensor of the external device is reliable by verifying that the external device is operating in a low-power mode;

receive information describing an ambient temperature reading from the ambient temperature sensor of the external device; and adjust the internal temperature threshold of the thermal control system based at least upon the information describing the ambient temperature reading from the ambient temperature sensor of the external device.

2. The computing device of claim 1, wherein the instructions are executable to further cause the processing circuitry to throttle performance of the computing device based at least upon the internal temperature threshold.

3. The computing device of claim 1, wherein the instructions are executable to further cause the processing circuitry to detect the external device in vicinity of the computing device by determining that the external device is communicatively connected to the computing device.

4. The computing device of claim 1, wherein the internal temperature threshold of the thermal control system is adjusted further based at least upon the reliability of the ambient temperature sensor of the external device.

5. The computing device of claim 1, wherein the instructions are executable to further cause the processing circuitry to determine that the ambient temperature sensor of the external device is reliable by detecting a relative distance of the external device to the computing device.

6. The computing device of claim 5, wherein the instructions are executable to further cause the processing circuitry to detect the relative distance using one or more of audio data, image data, or a wireless communication protocol.

7. The computing device of claim 5, wherein the instructions are executable to further cause the processing circuitry to adjust the internal temperature threshold of the thermal control system further based at least upon a weighted formula using the relative distance.

8. The computing device of claim 1, further comprising an internal temperature sensor, wherein the instructions are executable to further cause the processing circuitry to adjust the internal temperature threshold of the thermal control system further based at least upon a temperature reading of the internal temperature sensor.

9. The computing device of claim 8, wherein the instructions are executable to further cause the processing circuitry to adjust the internal temperature threshold of the thermal control system after determining that the temperature reading of the internal temperature sensor is above a predetermined threshold.

10. Enacted on a computing device comprising a thermal control system for controlling performance of the computing device based at least upon an internal temperature threshold, a method for validating sensors using an external device, the method comprising:

detecting the external device in vicinity of the computing device, wherein the external device comprises an ambient temperature sensor;

determining that the ambient temperature sensor of the external device is reliable by verifying that the external device is operating in a low-power mode;

receiving information describing an ambient temperature reading from the ambient temperature sensor of the external device; and adjusting the internal temperature threshold of the thermal control system based at least upon the information describing the ambient temperature reading from the ambient temperature sensor of the external device.

11. The method of claim 10, wherein the thermal control system throttles performance of the computing device based at least upon the internal temperature threshold.

12. The method of claim 10, wherein detecting the external device in vicinity of the computing device comprises determining that the external device is communicatively connected to the computing device.

13. The method of claim 10, wherein the internal temperature threshold of the thermal control system is adjusted further based at least upon the reliability of the ambient temperature sensor of the external device.

14. The method of claim 11, wherein determining that the ambient temperature sensor of the external device is reliable comprises:

detecting a relative distance of the external device to the computing device.

15. The method of claim 14, wherein the relative distance is determined using one or more of audio data, image data, or a wireless communication protocol.

16. The method of claim 14, wherein the internal temperature threshold of the thermal control system is adjusted further based at least upon a weighted formula using the relative distance.

17. The method of claim 10, wherein the computing device further comprises an internal temperature sensor, and wherein the internal temperature threshold of the thermal control system is adjusted upon determining that the temperature reading of the internal temperature sensor is above a predetermined threshold.

18. Enacted on a computing device comprising a thermal control system for controlling performance of the computing device based at least upon an internal temperature threshold, a method for validating sensors using an external device, the method comprising:

throttling performance of the computing device upon reaching the internal temperature threshold;

detecting the external device in vicinity of the computing device, wherein the external device comprises a temperature sensor;

determining that the temperature sensor of the external device is reliable by verifying that the external device is operating in a low-power mode;

receiving information describing a temperature reading from the temperature sensor of the external device; and increasing the internal temperature threshold of the thermal control system based at least upon the information describing the temperature reading from the temperature sensor of the external device.

* * * * *